United States Patent [19]

Haas et al.

[11] Patent Number: 4,585,022

[45] Date of Patent: Apr. 29, 1986

[54] ARRANGEMENT FOR CLEANING FUEL WITH AN ELECTRICAL WATER LEVEL INDICATING DEVICE

[75] Inventors: Wolfgang Haas, Stuttgart; Willi Müller, Sulz; Hans Schacht, Stuttgart; Erich Scholz, Neuhausen, all of Fed. Rep. of Germany

[73] Assignee: Robert Bosch GmbH, Stuttgart, Fed. Rep. of Germany

[21] Appl. No.: 770,002

[22] Filed: Aug. 26, 1985

Related U.S. Application Data

[63] Continuation of Ser. No. 497,737, May 24, 1983.

[30] Foreign Application Priority Data

Jul. 21, 1982 [DE] Fed. Rep. of Germany ....... 3227200

[51] Int. Cl.⁴ ............................................ B01D 17/025

[52] U.S. Cl. .................................... 137/172; 137/192; 137/203; 137/554; 137/558

[58] Field of Search ............... 137/172, 192, 193, 203, 137/433, 554, 558; 210/120, 123, 114, 213, 305, 306, 86

[56] References Cited

U.S. PATENT DOCUMENTS

| | | | |
|---|---|---|---|
| 1,302,948 | 5/1919 | Meston | 137/192 |
| 1,606,356 | 11/1926 | Fisher | 210/123 X |
| 2,204,998 | 11/1926 | Ryan et al. | 210/115 |
| 2,243,988 | 6/1941 | Stone | 210/114 |
| 2,842,156 | 7/1958 | Huneke | 137/415 |
| 3,071,148 | 1/1963 | Woodwansee | 137/193 |
| 3,113,282 | 12/1963 | Coleman | 210/86 |
| 3,424,311 | 1/1969 | Siedenburg | 210/123 X |
| 3,425,556 | 2/1969 | Volker | 210/123 |
| 3,437,771 | 4/1969 | Nusbaum | 137/558 |
| 3,568,835 | 3/1971 | Hansen | 210/123 X |
| 3,719,203 | 3/1973 | Wettre | 137/554 |
| 3,868,321 | 2/1975 | Gough | 210/86 |
| 4,010,101 | 3/1977 | Davey | 210/213 |
| 4,032,444 | 6/1977 | Wright et al. | 210/123 X |
| 4,053,405 | 10/1977 | De Keyser et al. | 210/123 X |
| 4,079,743 | 3/1978 | Weston | 137/192 |
| 4,132,646 | 1/1979 | Bartlett et al. | 210/11 X |
| 4,276,161 | 6/1981 | Matsui et al. | 210/86 |
| 4,294,288 | 10/1981 | Murthy | 137/192 |

*Primary Examiner*—Alan Cohan
*Attorney, Agent, or Firm*—Michael J. Striker

[57] ABSTRACT

An arrangement for cleaning fuel has a housing, a deflecting member in the housing and forming an annular gap extending between a fuel inlet and a fuel outlet and also a water storing chamber separated from the fuel inlet, and electrical water-level-indicating device including a rod-shaped impulse generator extending through the deflecting member into the interior of the water storing chamber and a one-piece float located in the water storing chamber and cooperating with the impulse generator, and a water discharge device provided with a throttle valve which includes a water discharge opening in the bottom of the housing and a throttle valve member cooperating with the water discharge opening, wherein the float forms the throttle member and has a guide opening and a closing surface cooperating with the water discharge opening, the guide opening goes completely through the float and the rod-shaped impulse generator extends into the throughgoing guide opening in condition of the closed throttle valve so as to guide the float in the housing, and the closing surface and the water discharge opening are radially offset relative to the throughgoing guide opening.

8 Claims, 3 Drawing Figures

ARRANGEMENT FOR CLEANING FUEL WITH AN ELECTRICAL WATER LEVEL INDICATING DEVICE

This is a continuation of application Ser. No. 497,737 filed May 24, 1983.

BACKGROUND OF THE INVENTION

The present invention relates to an arrangement for cleaning fuel with an electrical water level indicating device.

Such an arrangement was proposed in older patent applications, such as patent application Ser. No. 364,670, in which a funnel-shaped deflecting member forms in the interior of a housing an annular gap which extends between a fuel supply and a fuel discharge. A rod-shaped impulse generator is arranged centrally in a cover of the housing and extends through the deflecting member with its free end into a water storing chamber located under the deflecting member. A float which performs two functions is located in the water storing chamber. The float is both a part of an electrical water level indicating device, and also a part of a water discharge device. A permanent magnet is received in a central blind guide hole of the float and cooperates in the event of maximum water level with the impulse generator. The float also has a central spherical closing surface with which during water discharge it throttles the discharge of water via the outlet opening in the bottom of the housing and finally closes this opening. Although the one-piece float performing both functions is simple and inexpensive, it can lead in various applications to the disadvantage that the float with its outer circumference is guided in the bucket-shaped housing part. When the housing is damaged from outside, the float can be clamped and therefore its functions can be endangered. Further, the synthetic plastic material of the float can swell in certain fuels and in dependence on temperature, and thereby its friction in the guide increases, which can eventually lead to undesirably affecting of its functions. Such tilting of the float in the housing can further lead to the situation in which during the water discharge the water discharge opening is throttled by the float too fast and fuel can exit. Furthermore, the known arrangement has no ventilating valve.

U.S. Pat. No. 2,400,200 describes an oil filter in which a manually activated valve controls, in addition to the supply and the discharge for the filter, a ventilating conduit with a valve, and an outlet opening to a dirt collecting container. For discharge of dirt from a sump of the oil filter via the outlet opening into the dirt collecting container, the handactuated valve is opened, and it simultaneously blocks the supply and discharge for filter and the ventilating conduit. In this construction dirt can be removed safe from the filter which is under pressure. However, the filter does not have a float which simultaneously forms a part of a water level indicating device and a throttle valve.

SUMMARY OF THE INVENTION

Accordingly, it is an object of the present invention to provide an arrangement for cleaning fuel with an electric water level indicating device, which avoids the disadvantages of the prior art.

More particularly, it is an object of the present invention to provide a cleaning arrangement for cleaning fuel with an electrical water level indicating device which has the advantage that with maintaining of its simple and inexpensive construction, the reliability of its operation is increased.

In keeping with these objects and with others which will become apparent hereinafter,, one feature of the present invention resides, briefly stated, in that the guide opening in the float goes completely through the float so that the rod-shaped pulse generator extends into the throughgoing guide opening in condition of the closed throttle valve so as to guide the float in the housing, and the closing surface of the float and the water discharge opening of the bottom of the container are radially offset relative to the throughgoing guide opening of the float.

Since the central guide opening of the float guides the rod-shaped impulse generator over its entire stroke length, a friction-free guidance is obtained, so that tilting of the float even in the event of outer action onto the housing is avoided. Furthermore, the eccentric position of the throttle valve further improves the operation of the water discharge device.

The throttle valve of the water discharge device can be formed as a nozzle-plate valve, wherein the closing surface of the float can be formed by a plate which is circular-ring-shaped and the throttle valve can have a three-point support for the float, of which one point is formed by a nozzle. In such a construction the throttle valve is place-economical and cost-favorable, and moreover satisfies high requirements to tightness and service life.

In accordance with a further feature of the present invention, a ventilating valve can be arranged in the housing and formed so that it can be turned off. These features are especially advantageous inasmuch as the danger of exiting of fuel from the arrangement also in the event of failure is considerably reduced. By the turned off ventilating valve, it is obtained that during opening of the water discharge device without preliminary opening of the ventilating valve only such a quantity of pressure medium can discharge from the housing of the arrangement until the overpressure acting therein is formed. After this, a complete water discharge is carried out first after the opening of the ventilating valve. If further after the water discharge either the discharge device or the ventilating valve is again orderly closed and a motor of the device with a gasoline injecting system is started, no fuel discharge is despite the fact that in the housing of the arrangement pressure of several bars is formed.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
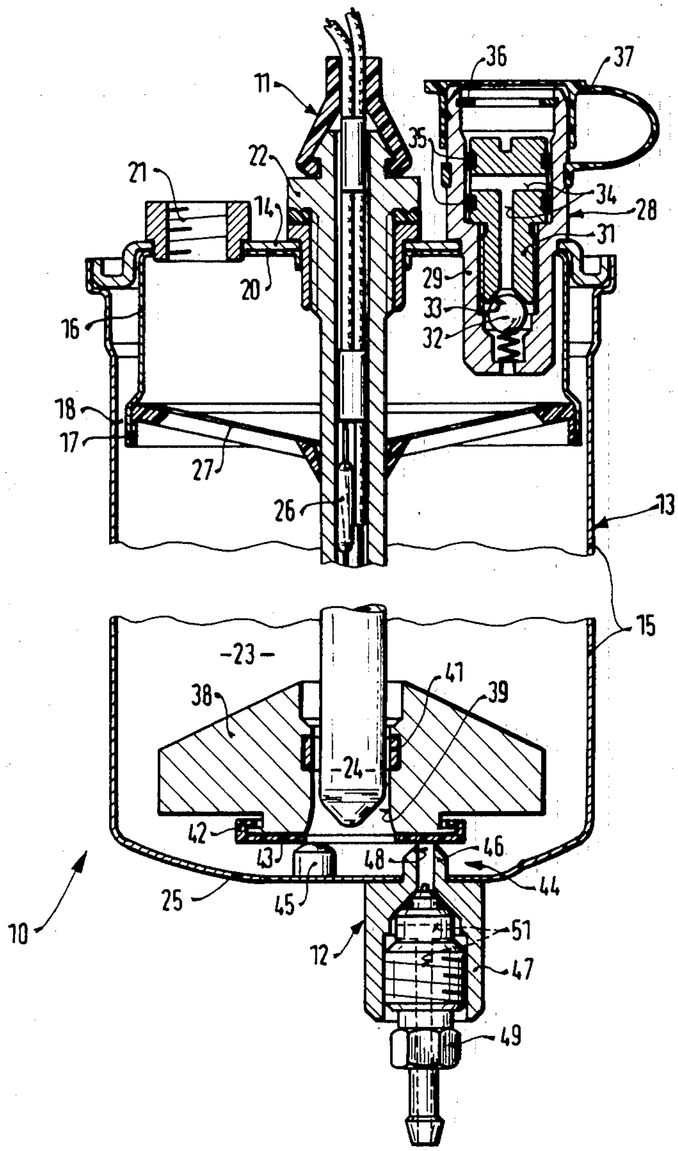
FIG. 1 is a view showing a longitudinal section of an arrangement for cleaning fuel, in accordance with the present invention.
Figure 2:
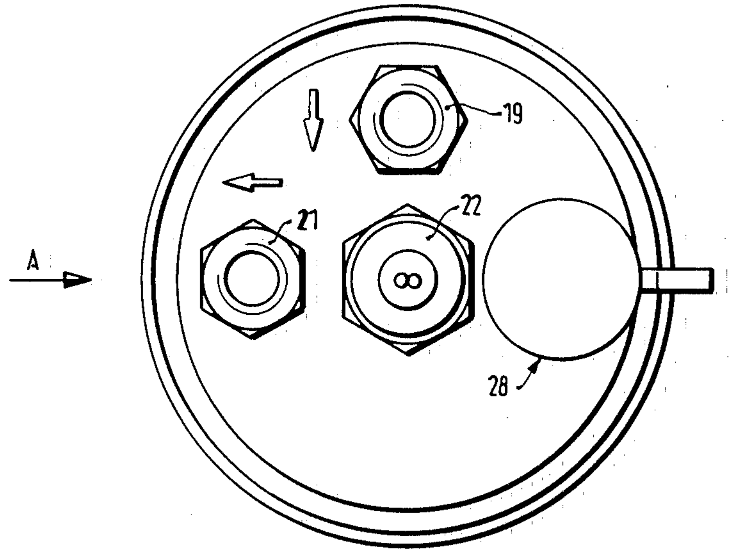
FIG. 2 is a plan view of the arrangement for cleaning fuel of FIG. 1.
Figure 3:
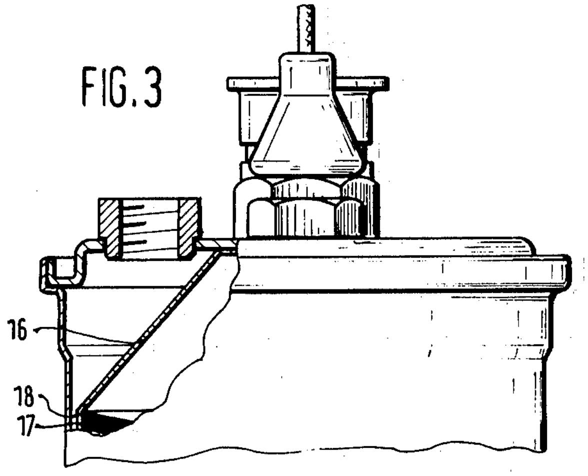
FIG. 3 is a partial view taken in direction of the arrow A in FIG. 2, partially in section.

FIG. 1 shows an arrangement for cleaning a fuel with an electric water level indicating device 11 and a discharge device 12. The arrangement can have the housing 13 which is composed substantially of a cover 14 and a bucket-shaped housing part 15. As can be seen from FIGS. 1 and 3, a funnel-shaped deflecting shield 16 is mounted on the cover 14. The deflecting shield 16 has a free edge 17 which extends into the interior of the housing and forms together with the housing part 15 a circular ring gap 18. The gap 18 extends between a supply 19 and a discharge 21.

A rod-like impulse generator 22 is arranged centrally in the cover 14. It extends through the deflecting shield 16 into the interior of a water storing chamber 23 formed in the bucket-shaped housing part 15 under the deflecting shield 16. The impulse generator 22 has a free end 24 which is located at a small distance from a bottom 25 of the bucket-shaped housing part 15.

A reed switch 26 is located in the interior of the impulse generator 22 and lies only somewhat below a sieve 27 inserted in the edge 17 of the deflecting shield 16. While the edge 17 of the deflecting shield 16 is circular, it has in the region of its bottom 20 a V-shaped cross section, so that pipes for the discharge 21, the impulse generator 22, and a ventilating valve 28 formed as a valve cartridge are arranged along a line one after the other and extend into the interior of the deflecting shield 16. Only a pipe for the supply 19 is arranged so that it is offset laterally in the cover 14 near the deflecting shield 16.

The ventilating valve 28 is composed of a valve sleeve 29 which is inserted into the cover 14, with a ventilating screw 31 and a spring-loaded check valve 32 arranged in the interior of the valve sleeve. The check valve 32 abuts under the action of a spring against a valve seat 33 of the ventilating screw 31 and blocks thereby a ventilating opening 34 provided in the latter. Sealing rings 35 are arranged in the head of the ventilating screw 31 and seal in the shown position of the ventilating screw 31 the opening 34 from outside. The ventilating valve 28 is thereby turned off in the shown position. The ventilating screw 31 can be turned outwardly until it abuts against a spring ring 36, whereby the ventilating opening 34 assumes connection with the outside atmosphere. A dust protecting cap 37 protects the ventilating valve 28.

A float 38 is arranged in the water storing chamber 23. It has a central throughgoing guide opening 39. A ring-shaped permanent magnet 41 lies in the guide opening 39 and cooperates with the reed switch 26. In the shown lowest position of the float 38 the end 24 of the impulse generator extends into the guide opening 39, so that the float 38 is guided over its entire stroke by the rod-shaped impulse generator 22 in friction-free fashion. A circular ring-shaped plate 42 is mounted at the lower side of the float 38 concentrically to the guide opening 39. The plate 42 forms a plane closing surface 43 for a throttle valve 44.

The float lies in its lowest position on two pins 45 which are fixedly mounted to the housing, and also on a nozzle 46 of a discharge sleeve 47. The nozzle 46 is provided with a relatively small outlet opening 48 and forms together with both pins 45 a three-point abutment for the float 38. For this purpose, the pins 45 and the nozzle 46 lie substantially at the corners of an equilateral triangle. The throttle valve 44 is formed thereby as a nozzle-plate valve which serves for good throttling of the discharge water, on the one hand, and for reliable sealing, on the other hand.

The float 38 can turn around a turning edge formed by the pin 45 and abut with its partial weight on the nozzle 46, so that it unobjectionably seals the outlet opening 44 in an exactly defined position. The closing surface 43 is rotation-symmetrical. Because the rotation-symmetrical construction of the closing plate 43 is provided, the service life of the throttle valve 44 is increased. An outwardly actuated discharge screw 49 with associated discharge openings 51 is arranged in the discharge sleeve 47.

The operation of the arrangement for cleaning fuel in accordance with the present invention is explained hereinbelow with the assumption that its basic function as a water separator is known:

The arrangement 10 is used in vehicles with gasoline injecting devices, wherein the supplying fuel travels via the inlet 19 into the interior of the housing 13, flows through the annular gap 18, and then flows through the sieve 27 and the discharge 21 to a subsequently connected aggregate. The separated water is collected on the bottom 25 of the water storing chamber 23 and upwardly lifts the float 38 with increase of the water level. The specific weight of the float 38 is selected so that it flows on water, but sinks in the fuel to be cleaned. With increased water level, the float 38 displaces upwardly and is guided during the displacement by the rod-shaped impulse generator 22 centrally and in friction-free manner. When the water storing chamber 23 is filled, the float 38 attains its maximum height, whereby the permanent magnet 41 of the reed switch 26 is actuated and turns on a not shown warning device. The warning device signals to an operator that water must be discharged from the arrangement 10. This step is carried out with immovable motor and turned off ignition. For this purpose the discharge screw 49 is opened and thereby water flows from the water storing chamber 23 via the discharge opening 48 outwardly. Only a small dewatering is possible, until a normally existing in the arrangement pressure of approximately 6 bars is formed. The quantity of discharged water is influenced by the size of the storage which is conventionally utilized in such gasoline injecting devices. Then the dust protecting cap 37 is removed from the ventilating valve 28 and the ventilating screw 31 is turned out until abutment against the spring ring 36. The ventilating openings 34 are now connected with the outside air, so that air can flow from outside via the check valve 32 into the interior of the housing 13. When this ventilating valve 28 is turned on by hand, water flows additionally from the water containing chamber 23 via the water discharge device 12. With lowering water level, the float 38 sinks downwardly and thereby the closing surface 43 which approaches the nozzle 48 first throttles the water discharge and finally completely blocks the same. The float 38 abuts against both pins 45 and supports with its partial weight on the nozzle 46, before the sinking water level reaches the outlet opening 48 and fuel can discharge. When the pressure medium no longer flows through the discharge screw 49, the operator can recognize that the water storing chamber 23 is sufficiently emptied. The discharge screw 49 is therefore closed, as well as the ventilating screw 31 and the arrangement 10 is thus ready for a new start.

The arrangement 10 prevents, first of all, that in the event of a faulty operation no gasoline can exit the interior of the housing 13. When an operator forgets after the water discharge to properly close the discharge screw 49 and/or the ventilating screw 31 again and during subsequent start of the motor a pressure is formed in the system, then the float 38 will lie with its closing surface 43 under the pressure difference which takes place on the nozzle 46 and block the path outwardly. Simultaneously, the check valve 32 abuts against the valve seat 33 and blocks the outwardly open ventilating opening 34. In this manner, a safety circuit is provided which in the event of faulty operation of the arrangement 10 prevents discharge of gasoline.

By the eccentric position of the throttle valve 44 relative to the impulse generator 22, the guide opening 39 in the float 38 can be formed passing through, so that the float 38 is centrally guided over its entire stroke region. The outer circumference of the float 38 is considerably smaller than the inner diameter of the bucket-shaped housing part 15, so that also in the event of slight damage to the housing 13, clamping of the float 38 is prevented. Also, swelling of the float 38 composed of synthetic plastic material or temperature-dependent deformations cannot undesirably affect the function of the float 38. The same is true with respect to slightly inclined positions of the arrangement 10.

It is to be understood that the shown arrangement 10 can have some changes without deviating from the invention. However, the shown embodiment with the one-piece float and the eccentrically arranged throttle valve provides for an especially advantageous combination.

It will be understood that each of the elements described above, or two or more together, may also find a useful application in other types of constructions differing from the types described above.

While the invention has been illustrated and described as embodied in an arrangement for cleaning fuel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An arrangement for cleaning fuel, comprising
   - a housing having a bottom, a fuel inlet, and a fuel outlet;
   - a deflecting member located in the interior of said housing and forming together with the latter an annular gap expending between said fuel inlet and said fuel outlet, and also forming a water storing chamber separated from said fuel inlet;
   - electrical water level indicating means including a stationary rod-shaped impulse generator having an axis and extending through said deflecting member into the interior of said water storing chamber, and a movable one-piece float located in said water storing chamber and guided by said rod-shape impulse generator;
   - water discharge means provided with a throttle valve which includes a water discharge opening formed in said bottom of said housing and a throttle valve member cooperating with and controlling said water discharge opening, said float forming said throttle valve member and having a central axis coinciding with said axis of said rod-like impulse generator and a central guide opening coaxial with said central axis, said float forming said throttle valve member also having a closing surface cooperating with and controlling said water discharge opening, said central guide opening going completely through said float and said rod-shaped impulse generator extending into said throughgoing central guide opening in condition of the closed throttle valve so as to guide said float in said housing, and said closing surface and said water discharge opening being radially offset relative to said throughgoing central guide opening, so that said float is guided in said housing centrally of said float and controls said discharge opening off-centrally of said float.

2. An arrangement as defined in claim 1, wherein said throttle valve of said water discharge means is formed as a nozzle-plate valve.

3. An arrangement as defined in claim 1, wherein said closing surface of said float is formed by a plate which is circular-ring-shaped and concentric with said guide opening.

4. An arrangement as defined in claim 2, wherein said throttle valve includes a nozzle and a three-point support on which said float supports in closed condition of said throttle valve, one point of said support being formed by said nozzle.

5. An arrangement as defined in claim 1; and further comprising ventilating valve arranged in said housing.

6. An arrangement as defined in claim 5, wherein said housing has a cover, said ventilating valve being formed as a valve cartridge which is mounted in said cover of said housing and has a ventilating screw and a check valve.

7. An arrangement as defined in claim 1, wherein said housing has a cover and is provided with a ventilating valve, said deflecting member being funnel-shaped and having at its free end a circular band which forms said gap as a throttling gap, said deflecting member also having another edge which is mounted on said cover of said housing and has a V-shaped cross section with a bottom part, said fuel discharge, said impulse generator, and said ventilating valve extending through said bottom part of said deflecting member, whereas said fuel inlet is arranged near said bottom part in said cover.

8. An arrangement for cleaning fuel, comprising
   - a housing having a bottom, a fuel inlet, and a fuel outlet;
   - a deflecting member located in the interior of said housing and forming together with the latter an annular gap extending between said fuel inlet and said fuel outlet, and also forming a water storing chamber separated from said fuel inlet;
   - electrical water level indicating means including a stationary rod-shaped impulse generator having an axis and extending through said deflecting member into the interior of said water storing chamber, and a movable one-piece float located in said water storing chamber and guided by said rod-shape impulse generator, said impulse generator being hollow and having a sensing member in its interior, said impulse generator being also formed so that it does not extend through said bottom of said housing and is exchangeable by withdrawal upwardly from said housing;

water discharge means provided with a throttle valve which includes a water discharge opening formed in said bottom of said housing and a throttle valve member cooperating with and controlling said water discharge opening, said float forming said throttle valve member and having a central axis coinciding with said axis of said rod-like impulse generator and a central guide opening coaxial with said central axis, said float forming said throttle valve member also having a closing surface cooperating with and controlling said water discharge opening, said central guide opening going completely through said float and said rod-shaped impulse generator extending into said throughgoing central guide opening in condition of the closed throttle valve so as to guide said float in said housing, and said closing surface and said water discharge opening being radially offset relative to said throughgoing central guide opening, so that said float is guided in said housing centrally of said float and controls said discharge opening off-centrally of said float.

* * * * *